United States Patent
Trago et al.

(10) Patent No.: US 6,705,581 B2
(45) Date of Patent: Mar. 16, 2004

(54) PIVOTABLE MOTOR MOUNTING APPARATUS

(75) Inventors: Bradley A. Trago, Rockford, IL (US); Dennis E. VanZee, Durand, IL (US); Donald Henry DeWall, Forreston, IL (US)

(73) Assignee: PacSci Motion Control, Inc., Rockford, IL (US)

( * ) Notice: Subject to any disclaimer, the term of this patent is extended or adjusted under 35 U.S.C. 154(b) by 5 days.

(21) Appl. No.: 09/865,857

(22) Filed: May 26, 2001

(65) Prior Publication Data

US 2002/0175264 A1 Nov. 28, 2002

(51) Int. Cl.$^7$ ................................................. F16H 7/14
(52) U.S. Cl. ........................ 248/656; 248/666; 310/91; 474/114
(58) Field of Search ................................ 248/635, 637, 248/656, 664, 666, 653, 674; 180/291; 310/91; 474/114, 26, 115; 16/254, 262, 261, 260, 263, 386

(56) References Cited

U.S. PATENT DOCUMENTS

| | | | |
|---|---|---|---|
| 84,771 A | * 12/1868 | Shannon | 16/263 |
| 1,802,485 A | 4/1931 | Smith et al. | 474/115 |
| 1,960,506 A | 5/1934 | Pfleger | 474/109 |
| 2,364,855 A | * 12/1944 | Kampstad et al. | 248/349.1 |
| 2,568,290 A | 9/1951 | Mountain | 248/662 |
| 3,477,670 A | * 11/1969 | Sloyan | 108/10 |
| 3,830,595 A | 8/1974 | Carpenter et al. | 417/363 |
| 4,240,368 A | 12/1980 | Adams | 112/220 |
| 4,350,104 A | 9/1982 | Cook | 112/220 |
| 4,360,950 A | 11/1982 | Miller | 15/412 |
| 4,503,792 A | 3/1985 | Cook | 112/220 |
| 4,566,689 A | * 1/1986 | Ogden | 474/115 |
| 4,573,239 A | * 3/1986 | Valenti et al. | 16/273 |
| 4,636,673 A | 1/1987 | McDonald | 310/91 |
| 4,678,953 A | * 7/1987 | Johnson | 193/9 |
| 4,789,127 A | * 12/1988 | Gleason et al. | 248/500 |
| 4,834,336 A | 5/1989 | Shimazaki et al. | 248/666 |
| 4,951,350 A | * 8/1990 | Nunes | 16/263 |
| 4,988,071 A | 1/1991 | Shimazaki et al. | 248/666 |
| 5,214,448 A | 5/1993 | Venthem | 346/139 |
| 5,785,620 A | * 7/1998 | Beutel et al. | 474/101 |
| 5,921,524 A | * 7/1999 | Kuo | 248/666 |
| 5,921,876 A | * 7/1999 | Zelinski | 188/67 |

FOREIGN PATENT DOCUMENTS

GB          2070727 A    *   9/1981

* cited by examiner

Primary Examiner—Ramon O. Ramirez
Assistant Examiner—Jon Szumny
(74) Attorney, Agent, or Firm—Greer, Burns & Crain, Ltd.

(57) ABSTRACT

Apparatus for mounting an electric motor, which is adapted to drive an endless belt at a predetermined tension, to a stationary frame, includes a housing that is adapted to receive the motor. A drive shaft extends from the front end of the housing and is adapted to drive the belt. An elongated base mount is integrally formed on the outside surface of the housing and extends from the front of the housing for pivotally coupling the housing to the stationary frame. The base mount has a first end and a second end, and a bore which extends longitudinally at least partially through the base mount from the first end and the second end of the base mount. A substantially rigid tab is fixedly attached to the cylindrical housing at a substantially opposite side from the base mount. The tension on the belt is set by applying a biasing force on the tab to pivot the motor about the axis of the base mount.

21 Claims, 4 Drawing Sheets

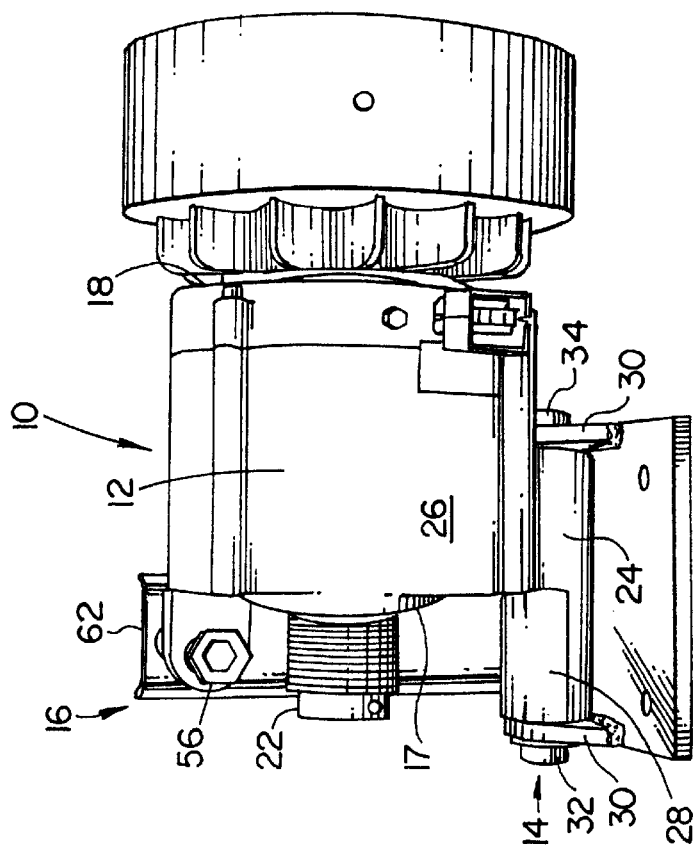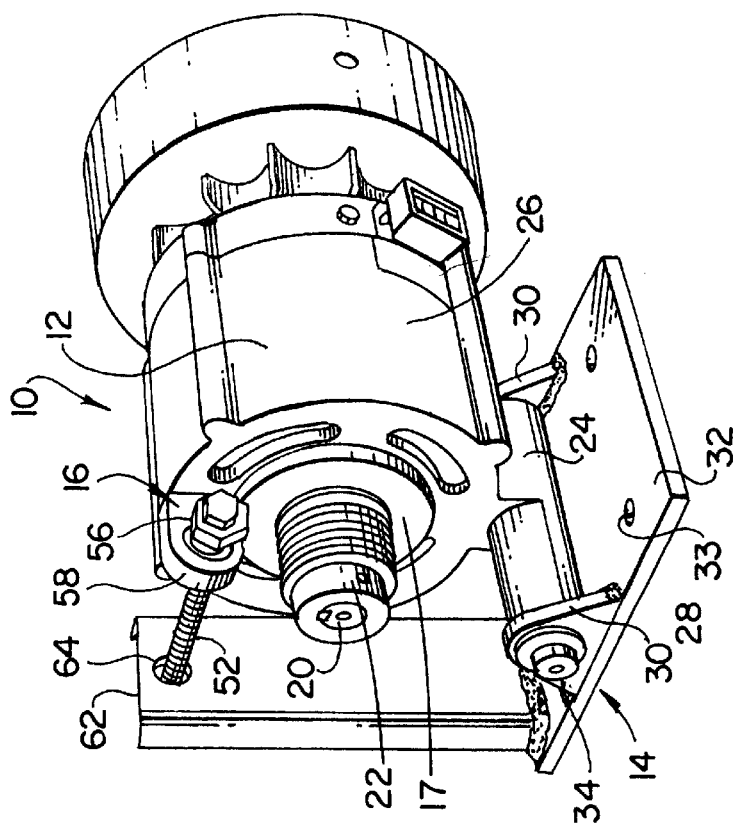

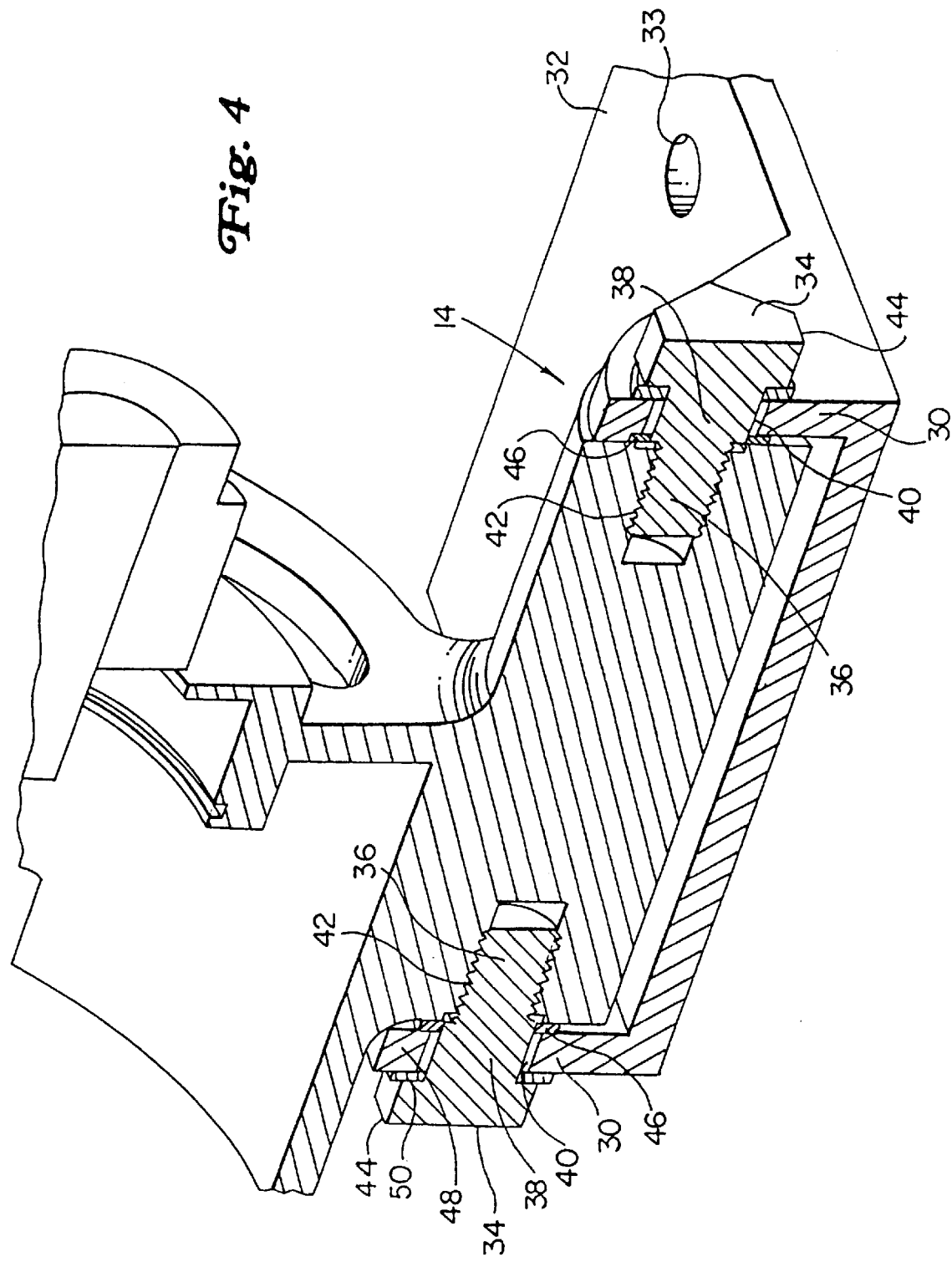

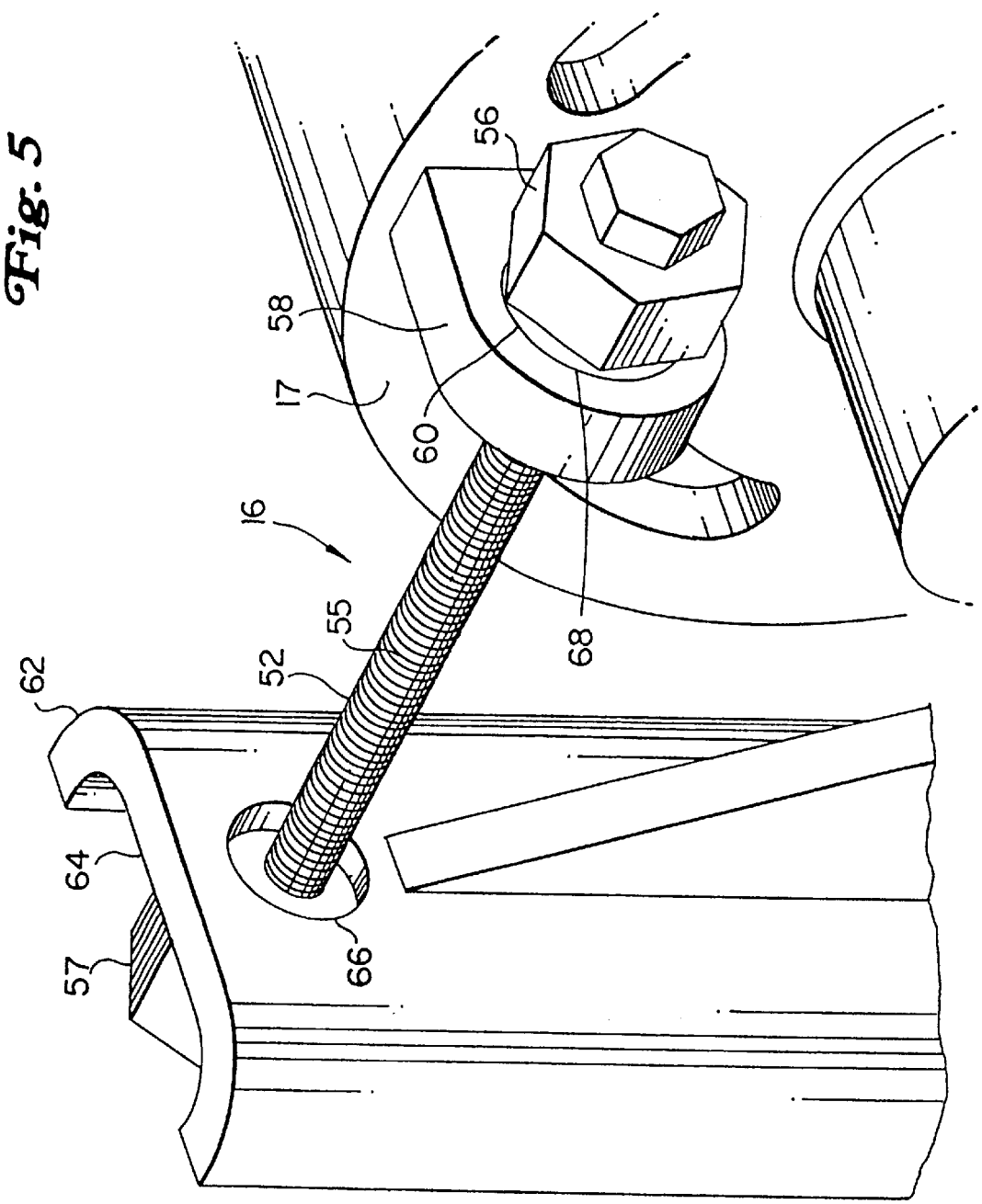

PIVOTABLE MOTOR MOUNTING APPARATUS

The present invention generally relates to motor mounts, and more particularly to a pivotable mount for a motor that is adapted to drive an endless belt at a predetermined tension.

The use of motors for driving an endless belt is commonly known in the art. This type of arrangement can be found in many different applications, for example, in treadmills, automobiles, etc. Typically, a pulley is attached to an end of a motor drive shaft. The belt is looped around the pulley and drives a load that is operatively engaged with the belt in the belt loop. The belt is set at a predetermined tension to drive or transfer rotational force of the pulley to the load. For applications requiring a large driving force from the motor, the belt must be at a substantially high tension. For motors used in treadmills, for example, the belt tension must be approximately 250 lbs. Setting the belt at this tension requires a substantial amount of force. This presents a problem particularly in conventional foot mounted motors. The force applied to the pulley by the belt during assembly causes the motor to twist in its foot mount, thus making assembly difficult.

Accordingly, it is a primary objective of the present invention to provide an improved motor mount.

Another object of the present invention is to provide an improved motor mount which facilitates easy tensioning of a drive belt during assembly.

Still another object of the present invention is to provide such an improved motor mount which pivots to adjust the tension on the drive belt.

Yet another object of the present invention is to provide such an improved motor mount which includes a tensioning device for setting the belt at a predetermined tension.

Other objects and advantages will become apparent upon reading the following detailed description, in conjunction with the attached drawings, in which:

FIG. 1 is a perspective view of a pivotable motor mount apparatus in accordance with the present invention;

FIG. 2 is a side view of the motor mount apparatus of FIG. 1;

FIG. 4 is a sectional view of a base mount of the motor mount apparatus of FIG. 1; and, FIG. 5 is a perspective view of a tensioning device of the motor mount assembly of FIG. 1.

DETAILED DESCRIPTION

Figure 3:
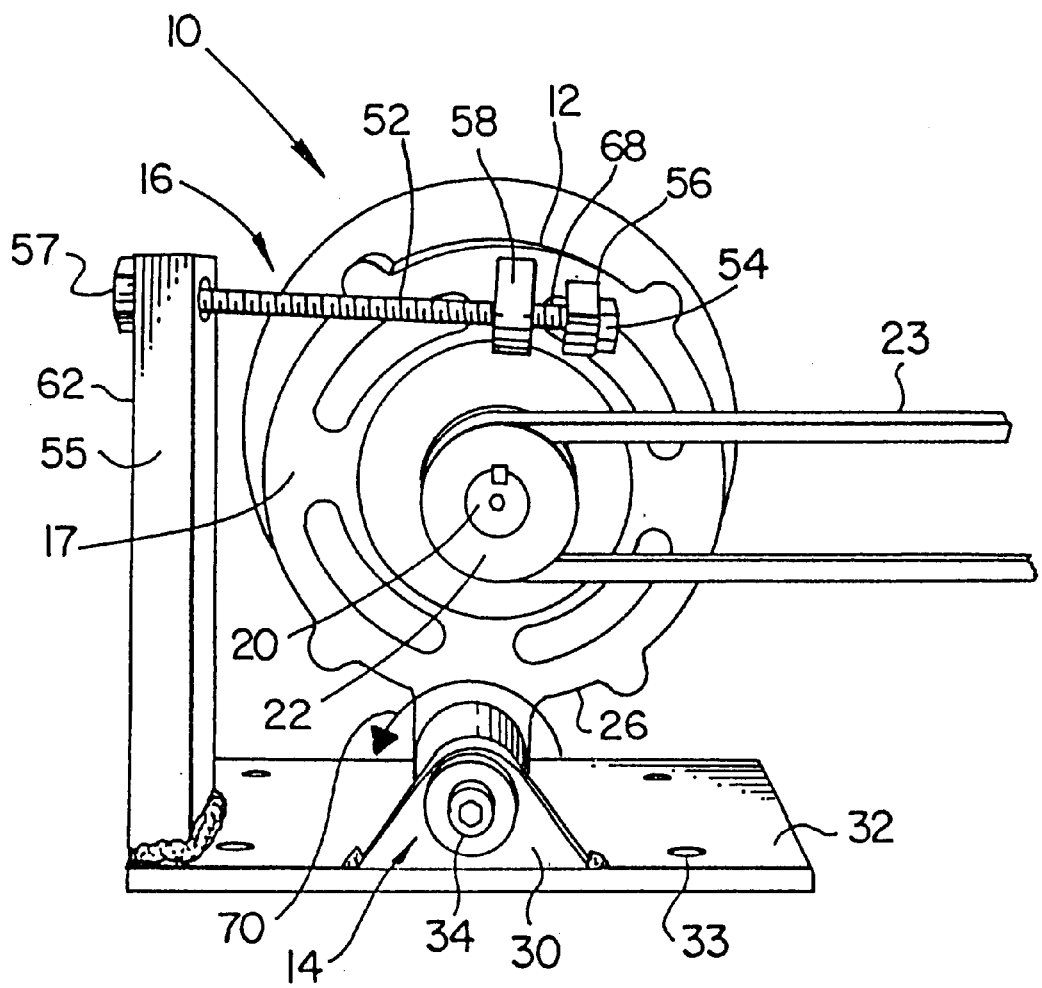
FIG. 3 is front view of the motor mount apparatus of FIG. 1.

The present invention is directed to a mount assembly for a motor which is adapted to drive an endless belt at a predetermined tension. The mount assembly includes a tubular base mount which is integrally attached to a motor housing and extends generally in parallel with the drive shaft of the motor. A tab is provided on the motor housing on the opposite side from the base mount, which is adapted to be pivotally connected to a stationary frame. Tension on the belt is set by applying pressure on the tab to pivot the motor about the axis of the base mount to a position corresponding to the desired tension and securing the motor at that position.

Broadly stated, the present invention is directed to an apparatus for mounting a motor, which is adapted to drive an endless belt at a predetermined tension, to a stationary frame. The apparatus includes a motor housing that has a front end and a rear end, and a drive shaft that extends from the front end of the housing for driving the belt. An elongated base mount is integrally formed on the outside surface and extends from the front end of the housing for pivotably coupling the housing to the stationary frame. The base mount has a first end and a second end, and a bore that extends longitudinally at least partially through the base mount from the first end and the second end of the base mount. A rigid tab is fixedly attached to the front end of the housing at a side substantially opposite from the base mount. Tension on the belt is set by applying a biasing force on the tab to pivot the motor about the axis of the base mount.

Turning now to FIGS. 1–3, the pivotable motor mount apparatus of the present invention is indicated generally at 10 and includes a housing 12, a base mount 14 and a tensioning assembly 16. The housing 12 is generally cylindrical to correspondingly receive a motor (not shown) and is formed preferably from aluminum, which has many desirable properties. Namely, aluminum does not rust, does not require painting and has good heat transfer characteristics. The housing 12 includes a front end 17 and a rear end 18. A drive shaft 20 extends from the front end 17 of the housing 12, and a pulley 22 is secured to this portion of the drive shaft (best seen in FIGS. 1 and 3). The pulley 22 is generally circular and has a width that is sufficient to cooperatively receive an endless belt 23 (shown in FIG. 3). When activated the motor rotates the drive shaft 20, which correspondingly rotates the pulley 22 about the axis of the drive shaft.

The base mount 14 is generally tubular and is preferably about the same length as that of the motor housing 12. A portion 24 on the outer surface of the base mount 14 is attached to the outer surface 26 of the housing 12, so that the axis of the drive shaft 20 and the base mount are substantially parallel. In accordance with one aspect of the present invention, the base mount 14 extends from the front surface 17 approximately the same distance as the pulley 22. This arrangement helps to eliminate twisting during assembly, because base mount 14 is generally in line with the force applied by the belt 23 to the base mount.

Turning now to FIG. 4, while still referring to FIGS. 1–3, the ends of the base mount 14 are adapted to be received between a pair of mounting brackets 30. The brackets 30 are spaced substantially parallel to each other and extend substantially perpendicularly from a generally flat plate 32. The plate 32 is also provided with holes 33 which allow the plate to be attached to a stationary frame of a device for which the motor is adapted to be used. In the preferred embodiment, the base mount 14 is pivotably secured to the brackets 30 by a pair of bolts 34, which includes a threaded portion 36 and a non-threaded shoulder portion 38 with a slightly wider diameter than the threaded portion. To secure the base mount 14 to the brackets 30, the bolts 34 are inserted through a hole 40 that is formed in the brackets, and screwed into a threaded bore 42 formed longitudinally from the ends and substantially at the axis of the base mount 14. While the bores 42 are shown in FIG. 4 as extending only partially into the base mount 14, they can extend entirely through the length of the base mount. The shoulder portions 38 allow the bolts 34 to be fixedly connected to the base mount 14 without permitting head portions 44 of the bolts to tighten against the brackets 30. In this manner, the shoulder portions 38 of the bolts 34 are rotatable within the holes 40 of the brackets 30, thereby allowing the base mount 14 to pivot about its axis, with acceptable friction.

As an alternative manner of mounting the base mount 14 to the brackets 30, the bores 42 can be extended entirely through the length of the base mount to form one continuous bore, and a single bolt 34 can be inserted through one bracket 30 and out the other, with the base mount provided between the brackets, and tightened with a nut at the end of the bolt. While the base mount 14 is described above as being tubular, it will be obvious to those skilled in the art that other shapes will also be workable, provided that the length and the diameter are such that they enable attachment with the mounting brackets 30 by the bolts 34 in the manner described above.

In accordance with one aspect of the present invention, a flexible washer 46 is provided between each of the brackets 30 and each end surface of the base mount 14 outside the threaded bores 42. Also, a flexible bushing 48 is provided in the holes 40 of the brackets 30 including a flange portion 50 that extends outside the hole (best shown in FIG. 4). The washer 46 and the bushing 48 are preferably made of rubber or like material with similar flexible properties. The washer 46 and the bushing 48 act to help isolate vibration from the motor.

Turning to FIG. 5, the tensioning assembly 16 preferably includes a bolt 52 having a head 54 (see also FIG. 3) and an elongated threaded shaft 55. A nut 56 is adapted to be screwed onto the shaft 55 until braced against the head 54, and a nut 57 is adapted to be screwed onto the bolt at the opposite end from the head. A tab 58 is formed integrally with the housing 12 at its front end 17. In the preferred embodiment, the tab 58 is located substantially on the opposite side of the housing 12 from the base mount 14 when viewed from the front (see FIG. 3), and extends approximately the same distance as the pulley 22. The tab 58 can also extend in the radial direction from the housing 12 as well. The tab 58 has a hole 60 that is configured to allow the shaft 55 to be inserted therethrough.

Also included in the tensioning assembly 16 is a stationary brace 62, which is shown attached perpendicularly to the plate 32 in FIGS. 1–3. It should be noted, however, that the brace 62 need only be stationary and does not have to be attached to the plate 32. The brace 62 has a hole 64 which is generally aligned with the hole 60 on the tab 58, such that the bolt 52 is permitted to be inserted through both holes 60, 64. The shaft 55 is sufficiently long enough to be inserted through the hole 60 in the tab 58 and extend beyond the hole 64 to receive the nut 57.

In the preferred embodiment, the nuts 56, 57 have spherical portions 68, 66, respectively (spherical portion 66 is best seen in FIG. 5 and portion 68 in FIG. 3). The spherical portion 68 eliminates point contact between the nut 57 and the hole 64 in the brace 62, and the spherical portion 68 between the nut 56 and the hole 60 in the tab 58. Likewise, the holes contacting the nuts 56, 57, that is holes 64 and 60, are each countersunk, thus making a conical surface to contact the spherical nuts. In other words, regardless of the angle at which the bolt 52 is inserted through the hole 60 and the hole 64, the spherical portions 66, 68 maintain a full contact with these holes.

It is contemplated that instead of the bolt 52 and the nuts 56, 57 that have spherical portions 68, 66, a bolt and a nut that do not have spherical portions (not shown) may also be employed for the purpose of applying tension on the belt 23. Moreover, a spring (not shown) may also be connected between the holes 64, 60 on the brace 62 and the tab 58, respectively.

Referring back to FIGS. 1 and 3, and in operation, the tension on the belt 23 is set by securing the base mount 14 between the two brackets 30 with the bolts 34, and inserting the bolt 52 through both holes 64, 60 on the brace 62 and the tab 58, respectively. When the nut 57 is screwed onto the bolt 52 and tightened against the brace 62, the motor housing 12 is pivoted about the axis of the base mount 14 in the direction indicated by an arrow 70, which increases tension on the belt 23. Loosening the nut 57 has the affect of pivoting the motor housing 12 in the direction opposite from the arrow 70. The nut 57 is tightened or loosened against the brace 62 until a desired tension on the belt 23 is obtained.

From the foregoing description, it should be understood that an improved mounting apparatus for a motor has been shown and described which has many desirable attributes and advantages. The apparatus includes a tubular base mount that is provided at the front end of a housing, and is constructed and adapted to be pivoted about its axis. A tab is provided on the front end of the housing on the opposite side from the base mount. Tensioning of a belt is set by applying force on the tab and causing the motor to pivot in the clockwise or the counterclockwise direction. In accordance with the present invention, the base mount, the pulley and the tab are generally in line with the force applied by the belt, so as to help eliminate twisting of the motor mount apparatus during assembly. Another advantage of the present invention is that the base mount helps to eliminate vibration from the motor.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An apparatus for mounting a motor, which is adapted to drive an endless belt at a predetermined tension, to a stationary frame, said apparatus comprising:

a housing adapted to receive the motor and having a first end and a second end;

a drive shaft operatively rotatable by the motor and extending from said first end of said housing, said drive shaft being adapted to drive the belt;

an elongated base mount integrally formed on an outside surface of and extending from said first end of said housing for pivotally coupling said housing to the stationary frame, said base mount having a first end and a second end, and a bore extending longitudinally at least partially through said base mount from said first end and said second end; and, a substantially rigid tab fixedly attached to said first end of said housing at a substantially opposite side from said base mount;

whereby the tension on the belt is set by applying a biasing force on said tab to pivot the motor about an axis of said base mount.

2. The apparatus as defined in claim 1 further comprising a pulley attached to a portion of said drive shaft which extends from said first end of said housing, said pulley being adapted to operatively engage the belt.

3. The apparatus as defined in claim 1 wherein said base mount is generally cylindrical.

4. The apparatus as defined in claim 1 further comprising two mounting bolts, each being constructed and adapted to be inserted through each said bore for pivotally securing said base mount to the stationary frame.

5. The apparatus as defined in claim 4 wherein said mounting bolts each have a threaded portion and a shoulder portion, said bores in the said base mount are internally threaded, said threaded portions of said mounting bolts are each adapted to be threaded into each said bore, and said shoulder portions are each adapted to be pivotally mounted to the frame.

6. The apparatus as defined in claim 1 wherein said bore extending from said first end of said base mount is connected to said bore extending from said second end of said base mount.

7. The apparatus as defined in claim 1 wherein said tab is attached to said second end of said housing and includes a through hole, said through hole having an axis substantially perpendicular to said axis of said base mount.

8. The apparatus as defined in claim 7 further comprising an elongated bolt and a first nut, said bolt having a head adapted to be braced against one of the stationary frame and said through hole of said tab, and a threaded portion being adapted to be inserted through the other of the stationary frame and said through hole and receive said first nut, wherein the motor is adapted to be pivoted about said axis of said base mount as said first nut is tightened and loosened on said threaded portion of said bolt.

9. The apparatus as defined in claim 8 further including a second nut that is adapted to be pushed in contact with said head, and wherein said first nut has a spherical portion which is adapted to make contact with one of the stationary frame and said through hole of said tab, and said second nut has a spherical portion which is adapted to make contact with the other of the stationary frame and said through hole.

10. The apparatus as defined in claim 1, wherein a portion of said base mount extending from said first end of said housing, and said tab are adapted to be generally in line with a force applied to said drive shaft by the belt.

11. A mounting apparatus for pivotally mounting a motor which is adapted to drive an endless belt at a predetermined tension, said apparatus comprising:

a generally cylindrical housing adapted to receive the motor having a first end and a second end;

a drive shaft operatively rotatable by the motor and extending from said first end of said housing and adapted to drive the belt;

a substantially tubular base mount having a portion integrally formed on an outside surface of said housing and extending from said first end of said housing substantially parallel to said drive shaft;

a stationary first base constructed and adapted to pivotally receive said tubular base mount;

a tab fixedly attached to said first end of said housing on substantially the opposite side from said base mount; and, an elongated adjusting means adapted to be removably connected to said tab at a first end and to a stationary second base at a second end;

wherein said adjusting means is adapted to apply a biasing force on said tab to pivot said housing about an axis of said tubular base mount to apply tension on the belt.

12. The apparatus as defined in claim 11 further comprising a pulley attached to a portion of said drive shaft which extends from said first end of said housing, said pulley being adapted to operatively engage the belt.

13. The apparatus as defined in claim 11 wherein said base mount has a first end and a second end, and a threaded bore extending longitudinally at least partially through said base mount from said first end and said second end of said base mount along an axis of said base mount.

14. The apparatus as defined in claim 13 wherein said first base has a pair of brackets spaced parallel to each other, and said base mount is adapted to be pivotally mounted between said brackets at said first and second ends of said base mount.

15. The apparatus as defined in claim 14 further comprising two mounting bolts, each said mounting bolt having a threaded portion and a shoulder portion, and wherein said threaded portions of said mounting bolts are each adapted to be threaded into each said threaded bore and said shoulder portions are each adapted to be pivotally mounted to each said bracket.

16. The apparatus as defined in claim 13 wherein said bore extending from said first end of said base mount is connected to said bore extending from said second end of said base mount along said axis of said base mount.

17. The apparatus as defined in claim 13 wherein said tab includes a through hole, said through hole having an axis substantially perpendicularly to said axis of said base mount.

18. The apparatus as defined in claim 17 wherein said adjusting means includes an elongated bolt and a first nut, said bolt having a head being adapted to be braced against one of said second base and said through hole of said tab, and a threaded portion being adapted to be inserted though the other of said second brace and said through hole and receive said first nut, further wherein said motor is adapted to be pivoted about said axis of said base mount as said first nut is tightened and loosened on said threaded portion of said bolt.

19. The apparatus as defined in claim 18 further including a second nut that is adapted to be pushed in contact with said head, and wherein said first nut has a spherical portion which is adapted make full contact with one of said second brace and said through hole of said tab, and said second nut has a spherical portion which is adapted to make contact with other of said stationary second brace and said through hole.

20. The apparatus as defined in claim 18 wherein said stationary second base is attached substantially perpendicularly to said first base.

21. The apparatus as defined in claim 11, wherein said portion of said base mount extending from said first end of said housing, and said tab are adapted to be generally in line with a force applied to said drive shaft by the belt.

* * * * *